Aug. 14, 1928.

M. VEENSTRA

SNOWPLOW 1,681,022

Filed Feb. 1, 1927

Inventor
Martin Veenstra
By Frank E. Liverance Jr.
Attorney.

Patented Aug. 14, 1928.

1,681,022

UNITED STATES PATENT OFFICE.

MARTIN VEENSTRA, OF ADA, MICHIGAN.

SNOWPLOW.

Application filed February 1, 1927. Serial No. 165,086.

This invention relates to improvement in snow plows and particularly those adapted to be attached to tractors and used on sidewalks where it is necessary for the plow and tractor to climb over relatively high obstacles such as street curbings, etc. A plow so used must necessarily be exceedingly flexible in its connection with the tractor which carries it so that it will tilt universally in moving over obstacles but will normally rest in a horizontal plane. The plow embodying this invention is designed to readily tilt in any direction sufficiently to permit it to rise over curbing or other obstructions, it is simply and substantially made and is provided with various novel features of construction and arrangement as hereinafter more fully described and particularly pointed out in the claims, reference being had to the accompanying drawing, in which, Fig. 1 is a perspective view of a plow embodying this invention attached to the front of a tractor which is shown in diagrammatic form.

Like reference characters refer to like parts in the different figures of the drawing.

Figure 1:
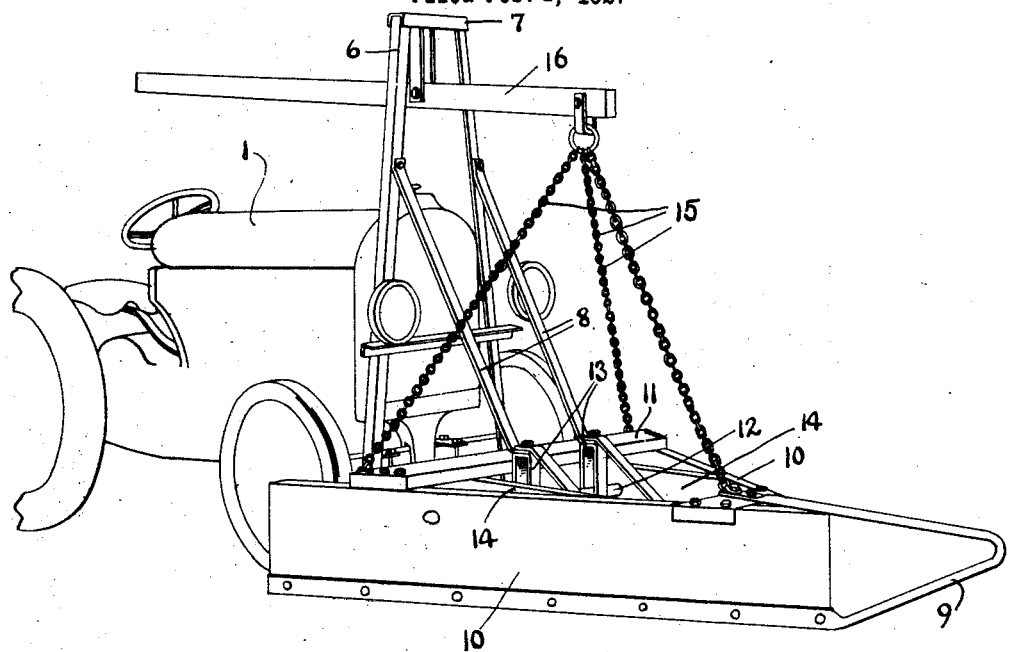
Figure 2:
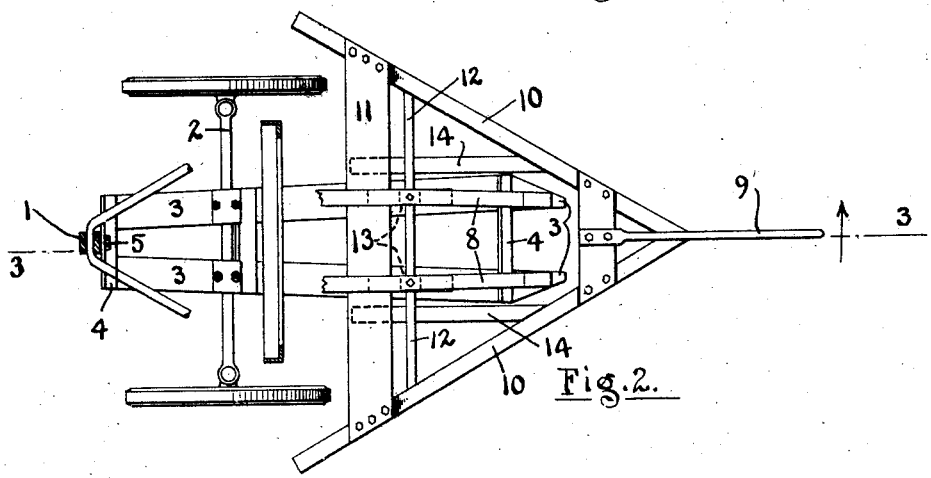
Fig. 2 is a fragmentary plan view of the same with parts broken away.
Figure 3:
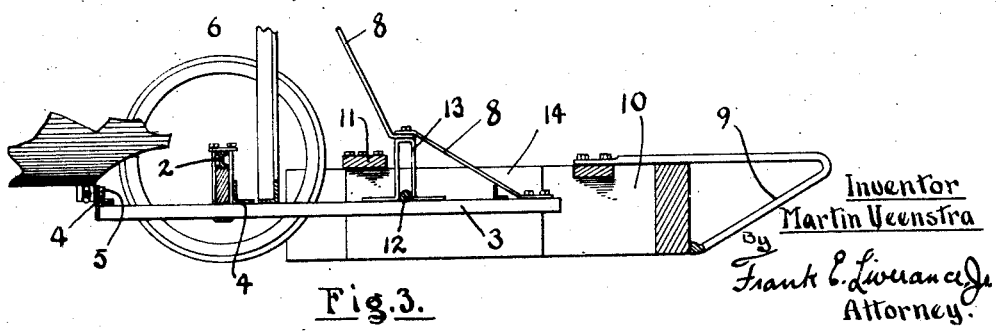
Fig. 3 is a longitudinal sectional elevation with parts broken away on the line 3—3 of Fig. 2.

1 represents the tractor having a front axle 2. The supporting bracket of the plow comprises the horizontal beams 3 which are rigidly attached to the axle by clips and by a bolt 5 at the rear end to the under part of the tractor. The beams 3 are held in spaced apart relation by cross members 4 and extend horizontally near the ground forward of the tractor. An upright member 6 having a head 7 at the top is supported by the beams 3 and is braced by diagonal braces 8 extending from the upright member 6 to the beams.

The plow member which is of the conventional V-shape has an inclined shoe 9 at its apex and its diverging wings 10 are braced near their rear edges by a cross member 11. A shaft 12 extends between the wings 10 of the plow and over the beams 3 of the bracket and through the vertical guides 13, one of which is provided on each beam. The vertical guides 13 have vertically elongated slots through which the shaft 12 passes so that it is permitted a vertical movement. Guide boards 14 fixed to the plow structure extend at the respective sides of the beams and prevent side motion of the plow relative to the beams.

It will be seen that the above structure permits the plow to rock in any direction relative to the beams by virtue of the movement of the shaft 12 in the guides 13 and that the plow is driven by the shaft 12 in the guides 13 in any position that it assumes. By this structure the plow may be moved in front of the tractor over obstacles, such as curbing, which are engaged by the inclined shoe 9 causing the plow to rise at the front and if the obstacle is uneven the plow may also tilt sidewise and pass over the obstacle but upon passing over it it will assume a horizontal position and function as it should.

A hoisting device is provided comprising chains 15 attached to the plow and to the forward end of a lever 16 fulcrumed on the head 7 and extending rearwardly where it may be operated by the driver of the tractor. This hoisting device is principally for the purpose of holding the plow out of engagement with the road or sidewalk surface when it is being transported from place to place.

I claim:

1. A snow plow comprising, a bracket adapted to be rigidly attached to a vehicle, vertically slotted guides on said bracket, a plow structure, and a shaft on said plow structure extending through said vertically slotted guides.

2. A snow plow comprising, a bracket adapted to be rigidly attached to a vehicle, vertically slotted guides on said bracket, a plow structure having a shaft extending through said vertically slotted guides, and means for preventing side movement of the plow relative to the bracket.

3. A snow plow comprising, a bracket adapted to be rigidly attached to a vehicle, vertically slotted guides on said bracket, a plow structure having a shaft extending through said guides, and members forming a part of the plow structure arranged at each respective side of the bracket to prevent sidewise movement of the plow.

4. A snow plow comprising, a substantially V-shaped plow member, a bracket adapted to be rigidly attached to a vehicle and extending between the sides of said plow member, vertically slotted guides on said bracket located between the forward and rear lower bearing edges of said plow member, a shaft fixed to said plow member and extending transversely of the bracket and through said guides and means for preventing lateral movement of said plow member relative to said bracket.

In testimony whereof I affix my signature.

MARTIN VEENSTRA.